(No Model.)

C. F. AMES & H. A. REARSON.
PHOTOGRAPHIC CAMERA.

No. 594,368. Patented Nov. 30, 1897.

WITNESSES
A. W. Bayard.
J. A. Paul.

INVENTORS
Charles F. Ames
Henry A. Rearson
per Fred W. Chacker
Atty.

UNITED STATES PATENT OFFICE.

CHARLES F. AMES AND HENRY A. REARSON, OF BOSTON, MASSACHUSETTS, ASSIGNORS TO D. L. GOFF, OF PAWTUCKET, RHODE ISLAND.

PHOTOGRAPHIC CAMERA.

SPECIFICATION forming part of Letters Patent No. 594,368, dated November 30, 1897.

Application filed July 16, 1896. Serial No. 599,422. (No model.)

*To all whom it may concern:*

Be it known that we, CHARLES F. AMES and HENRY A. REARSON, of Boston, in the county of Suffolk and State of Massachusetts, have invented certain new and useful Improvements in Photographic Cameras, of which the following is a description sufficiently full, clear, and exact to enable those skilled in the art to which it appertains or with which it is most nearly connected to make and use the same.

This invention has relation to means for loading and unloading cameras with films, the object of the invention being to provide such improvements in means of the kind mentioned as will enable the photographic-film roll to be placed directly in the camera without the necessity of first putting it in an inclosing case or without the inconveniences and dangers of exposure heretofore existing and to provide other improvements incidental to the foregoing.

To these ends the invention consists, broadly, of a photographic-camera cover provided with a film-supporting frame, which frame is adapted to be drawn out or is made extensible relative to the cover, so that the film can with the utmost convenience be placed in position in the frame or removed therefrom.

The invention also consists of other improvements, all as we will now proceed to describe and claim.

Reference is to be had to the annexed drawings, and to the letters marked thereon, forming a part of this specification, the same letters designating the same parts or features, as the case may be, wherever they occur.

Figure 1:
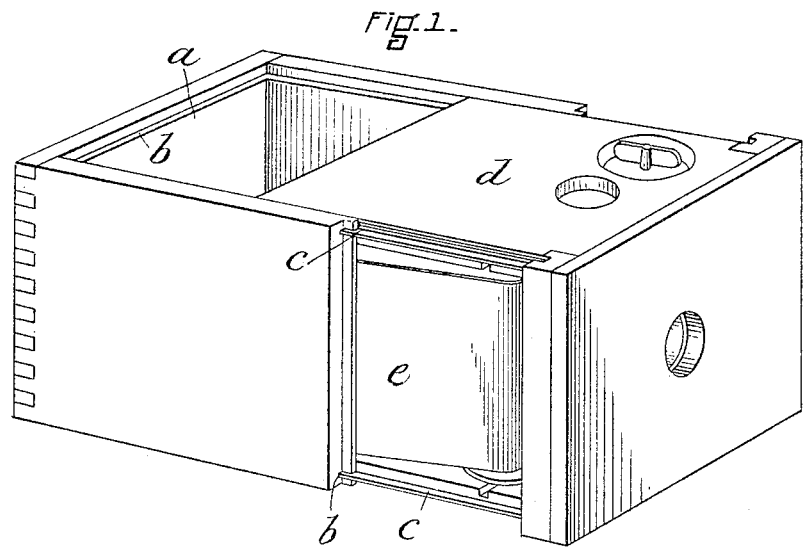
Figure 2:
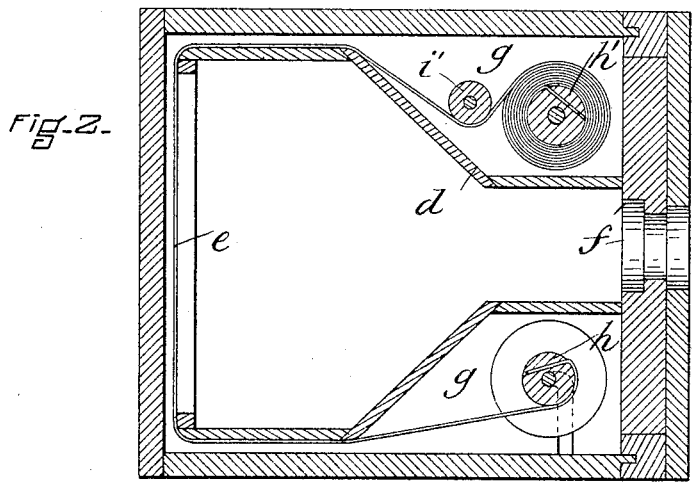
Figure 3:
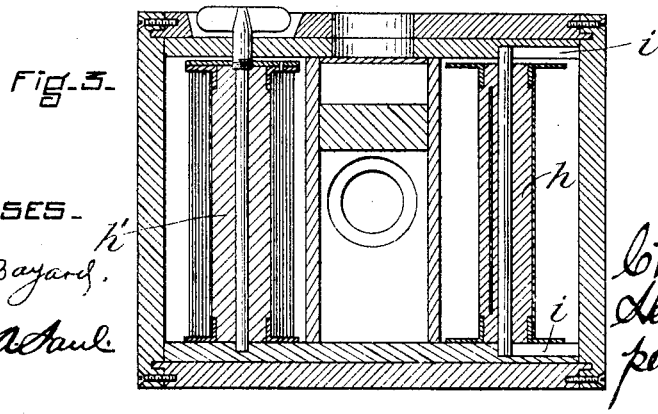

On the drawings, Figure 1 is a perspective view of our improved camera, showing the film-supporting frame as extended or drawn out to enable the camera to be loaded or unloaded. Fig. 2 is a horizontal sectional view of the same, but showing the film-supporting frame as pushed back into the camera-cover in order that the film may be exposed in the act of taking pictures. Fig. 3 is a vertical sectional view taken on a line running through the winding-rolls.

In the drawings, $a$ designates the camera-cover, which is preferably made open at the top and bottom and at one end and is provided near its upper and lower edges with grooves $b$ to receive tongues $c$, formed near the edges and at the end of a film-supporting frame $d$. This construction enables the frame to be slid into and out of the cover and when in the cover to have a light-tight connection therewith.

The film-supporting frame is made open at its rear end, so that the film $e$ can be exposed when it is so desired in order to take a picture, and at its forward end the said frame is provided with lens-supporting means $f$, as well also as with a shutter and its coöperative parts, the latter not being represented in the drawings.

In the sides of the film-supporting frame and at its forward part recesses $g$ are formed for the reception of the spools or winding-rolls $h$ $h'$. The roll or spool $h$ is placed in, supported, and removed from place by means of slots $i$, formed in the bottom and top of the frame and provided at their inner ends with angular parts or offsets to receive the pintle or axle of the said spool, and the same thing just described is accomplished with the spool $h'$ by making its pintle or axle removable.

In our invention we use a film of the usual material, which may be sensitized in any suitable way and have formed therein at regular intervals along its length and near the edge thereof openings or holes which occur at points coincident with the lines upon which it is intended that the film should be cut; and at each end of the strip is attached to or formed therewith an opaque substance, so that before and after exposure when the film is wound upon spools or formed into rolls light may be excluded therefrom.

By drawing out the frame $d$, as is shown in Fig. 1, the roll or spool $h$ may be placed in position, as aforesaid, and the light-excluding unsensitized end of the film may be carried to the inner end of the frame, along the same and along the back or opposite side, behind the tension or guide roll $i'$ to the roll or spool $h'$, and the free end secured thereto in a suitable or known way. Then the frame $d$ may be shoved back in the cover $a$, so that by turning the spindle of the roll or spool $h'$ the film may be controlled in the production of pictures or the making of exposures, as may be desired.

In order to prevent the film-supporting frame from being drawn entirely out of the inclosing cover, we provide stops $j$, which are connected with the cover and which extend into slots in the side of the frame and engage with lugs or similar devices, so as to stop the frame at a particular point when an effort is made to draw it out.

It will thus be seen that we may reload and unload the camera—that is, introduce or take out the film-rolls—in the most simple, speedy, and economical manner, and at the same time produce an instrument which when closed is perfectly light-tight, is compact, and in all respects highly efficient.

Having thus explained the nature of the invention and described a way of constructing and using the same, though without attempting to set forth all of the forms in which it may be made or all of the modes of its use, it is declared that what is claimed is—

1. In a photographic camera, the combination with a three-sided inclosing cover, of a three-sided film-supporting frame telescoping the cover and adapted to be drawn out or made extensible relatively thereto, said frame having a series of slots formed in the top and bottom thereof, which slots are provided at their inner ends with angular parts to receive spool-pintles and hold the same in position, a series of film-supporting spools suitably supported in the film-frame, stops to limit the extent to which said frame may be drawn out, and lens-supporting means at the forward end of the frame.

2. In a photographic camera, the combination with the three-sided inclosing cover open at the top and bottom and provided at its upper and lower edges with grooves, of a three-sided film-supporting frame telescoping the cover and provided with tongues at the top and bottom thereof to ride in the grooves in the cover, tongues on the front edges of the cover adapted to register with grooves in the film-frame, by which means the camera is made light-tight, and film-supporting rolls suitably journaled in the film-frame.

In testimony whereof we have signed our names to this specification, in the presence of two subscribing witnesses, this 9th day of July, A. D. 1896.

CHARLES F. AMES.
HENRY A. REARSON.

Witnesses:
MARY W. ROBERTS,
JOHN L. S. ROBERTS.